(12) United States Patent
Morgan et al.

(10) Patent No.: US 9,489,677 B2
(45) Date of Patent: Nov. 8, 2016

(54) SYSTEMS AND METHODS FOR DELIVERING TAILORED CONTENT BASED UPON A CONSUMER PROFILE

(75) Inventors: Robert E. Morgan, Peoria, AZ (US); Hitesh K. Seth, East Windsor, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 8 days.

(21) Appl. No.: 13/489,355

(22) Filed: Jun. 5, 2012

(65) Prior Publication Data

US 2013/0325875 A1    Dec. 5, 2013

Related U.S. Application Data

(63) Continuation of application No. 13/488,285, filed on Jun. 4, 2012.

(51) Int. Cl.
    *G06Q 30/00*       (2012.01)
    *G06Q 30/02*       (2012.01)

(52) U.S. Cl.
    CPC .................................. *G06Q 30/02* (2013.01)

(58) Field of Classification Search
    USPC .......................................................... 705/14
    See application file for complete search history.

(56) References Cited

U.S. PATENT DOCUMENTS

| | | |
|---|---|---|
| 5,696,965 A | 12/1997 | Dedrick |
| 7,983,401 B1 | 7/2011 | Krinsky |
| 2005/0240488 A1 | 10/2005 | Grendel et al. |
| 2007/0032247 A1 | 2/2007 | Shaffer et al. |
| 2007/0088624 A1 | 4/2007 | Vaughn et al. |
| 2007/0088713 A1 | 4/2007 | Baxter et al. |
| 2007/0239535 A1 | 10/2007 | Koran et al. |
| 2008/0189360 A1 | 8/2008 | Kiley et al. |
| 2009/0132364 A1 | 5/2009 | Agarwal |
| 2009/0292584 A1* | 11/2009 | Dalal et al. ..................... 705/10 |
| 2010/0161432 A1 | 6/2010 | Kumanov et al. |
| 2010/0262499 A1 | 10/2010 | Karlsson et al. |
| 2011/0202404 A1 | 8/2011 | van der Riet |
| 2011/0295671 A1 | 12/2011 | Thomas et al. |
| 2012/0011033 A1 | 1/2012 | Salgia |
| 2012/0047012 A1* | 2/2012 | Pedersen et al. .......... 705/14.49 |
| 2012/0208461 A1 | 8/2012 | Choi et al. |
| 2012/0221418 A1 | 8/2012 | Smith |

(Continued)

OTHER PUBLICATIONS

Office Action dated Jul. 5, 2013 in U.S. Appl. No. 13/488,285.

(Continued)

*Primary Examiner* — Alvin L Brown
(74) *Attorney, Agent, or Firm* — Snell & Wilmer L.L.P.

(57) ABSTRACT

The present disclosure includes a system, method, and article of manufacture for aggregating a consumer profile, identifying tailored content (e.g., in response to a trigger event and/or based upon a consumer profile), and/or tailoring a digital destination. For example, the systems may receive direct data indicating an interest in receiving specific content, aggregate that data into a consumer profile, compare the consumer profile to content, and/or identify tailored content based upon the comparison. Further, the systems may communicate the tailored content to a web client associated with a consumer, receive a transaction request from a web client, and/or receive bids associated with tailored content. In addition, these systems may prioritize tailored content comprising a plurality of tailored offers and/or forecast a budget for an upcoming experience.

20 Claims, 8 Drawing Sheets

(56) References Cited

U.S. PATENT DOCUMENTS

| | | | |
|---|---|---|---|
| 2012/0246003 | A1 | 9/2012 | Hart et al. |
| 2012/0246007 | A1 | 9/2012 | Williams et al. |
| 2012/0323805 | A1 | 12/2012 | Udani |
| 2013/0030919 | A1 | 1/2013 | Brinson et al. |
| 2013/0072116 | A1 | 3/2013 | Song et al. |
| 2013/0166406 | A1 | 6/2013 | Yardley et al. |
| 2013/0166580 | A1 | 6/2013 | Maharajh et al. |
| 2013/0173390 | A1 | 7/2013 | Polo |
| 2013/0179268 | A1* | 7/2013 | Hu et al. .................. 705/14.66 |
| 2013/0218713 | A1 | 8/2013 | Gottfurcht et al. |
| 2013/0225595 | A1 | 8/2013 | Gillies et al. |
| 2013/0297416 | A1 | 11/2013 | Dipaola et al. |
| 2013/0311337 | A1 | 11/2013 | Stoll et al. |
| 2013/0325547 | A1 | 12/2013 | Clark |
| 2013/0332355 | A1 | 12/2013 | Atsmon et al. |
| 2014/0040028 | A1 | 2/2014 | King et al. |
| 2014/0074612 | A1 | 3/2014 | Mahadevan et al. |
| 2014/0114706 | A1 | 4/2014 | Blakely |
| 2014/0122211 | A1 | 5/2014 | Diab et al. |

OTHER PUBLICATIONS

Office Action dated Aug. 26, 2015 in U.S. Appl. No. 13/827,935.
Office Action dated Aug. 27, 2015 in U.S. Appl. No. 14/320,217.
Office Action dated Aug. 27, 2015 in U.S. Appl. No. 14/320,091.
Office Action dated Sep. 2, 2015 in U.S. Appl. No. 14/319,438.
Office Action dated Sep. 8, 2015 in U.S. Appl. No. 14/319,930.
Final Office Action dated Sep. 9, 2015 in U.S. Appl. No. 13/488,197.
Office Action dated Sep. 10, 2015 in U.S. Appl. No. 14/320,367.
Office Action dated Sep. 11, 2015 in U.S. Appl. No. 14/320,303.
Office Action dated Feb. 20, 2015 in U.S. Appl. No. 13/488,197.
Final Office Action dated Mar. 20, 2015 in U.S. Appl. No. 14/319,438.
Final Office Action dated Mar. 20, 2015 in U.S. Appl. No. 13/827,935.
Final Office Action dated Mar. 20, 2015 in U.S. Appl. No. 14/320,091.
Final Office Action dated Mar. 20, 2015 in U.S. Appl. No. 14/320,263.
Final Office Action dated Mar. 20, 2015 in U.S. Appl. No. 14/320,341.
Final Office Action dated Mar. 20, 2015 in U.S. Appl. No. 14/320,367.
Final Office Action dated Mar. 31, 2015 in U.S. Appl. No. 14/319,930.
Final Office Action dated Mar. 31, 2015 in U.S. Appl. No. 14/320,303.
Final Office Action dated Apr. 6, 2015 in U.S. Appl. No. 14/320,153.
Final Office Action dated Apr. 6, 2015 in U.S. Appl. No. 14/320,217.
Office Action dated Aug. 13, 2014 in U.S. Appl. No. 13/827,935.
Office Action dated Aug. 13, 2014 in U.S. Appl. No. 14/319,930.
Office Action dated Aug. 14, 2014 in U.S. Appl. No. 14/319,438.
Final Office Action dated Aug. 13, 2014 in U.S. Appl. No. 13/489,274.
Office Action dated Aug. 15, 2014 in U.S. Appl. No. 14/320,091.
Final Office Action dated Aug. 14, 2014 in U.S. Appl. No. 13/489,295.
Final Office Action dated Aug. 15, 2014 in U.S. Appl. No. 13/489,320.
Final Office Action dated Aug. 19, 2014 in U.S. Appl. No. 13/489,340.
Office Action dated Aug. 27, 2014 in U.S. Appl. No. 14/320,367.
Office Action dated Aug. 29, 2014 in U.S. Appl. No. 14/320,217.
Office Action dated Sep. 5, 2014 in U.S. Appl. No. 14/320,341.
Advisory Action dated Sep. 23, 2014 in U.S. Appl. No. 13/489,274.
Advisory Action dated Sep. 18, 2014 in U.S. Appl. No. 13/489,295.
Advisory Action dated Sep. 23, 2014 in U.S. Appl. No. 13/489,320.
Advisory Action dated Sep. 23, 2014 in U.S. Appl. No. 13/489,340.
Office Action dated Oct. 2, 2014 in U.S. Appl. No. 14/320,303.
Office Action dated Oct. 2, 2014 in U.S. Appl. No. 14/320,153.
Office Action dated Oct. 2, 2014 in U.S. Appl. No. 14/320,263.
Advisory Action dated Jun. 2, 2015 in U.S. Appl. No. 13/827,935.
Advisory Action dated Jun. 2, 2015 in U.S. Appl. No. 14/320,263.
Advisory Action dated Jun. 2, 2015 in U.S. Appl. No. 14/320,303.
Advisory Action dated Jun. 3, 2015 in U.S. Appl. No. 14/320,091.
Advisory Action dated Jun. 3, 2015 in U.S. Appl. No. 14/320,341.
Advisory Action dated Jun. 4, 2015 in U.S. Appl. No. 14/319,438.
Advisory Action dated Jun. 4, 2015 in U.S. Appl. No. 14/319,930.
Advisory Action dated Jun. 4, 2015 in U.S. Appl. No. 14/320,367.
Advisory Action dated Jun. 10, 2015 in U.S. Appl. No. 14/320,217.
Advisory Action dated Jun. 17, 2015 in U.S. Appl. No. 14/320,153.
Office Action dated Jun. 30, 2015 in U.S. Appl. No. 13/488,285.
Notice of Allowance dated Dec. 2, 2015 in U.S. Appl. No. 14/319,438.
Office Action dated Nov. 10, 2015 in U.S. Appl. No. 13/489,340.
Advisory Action dated Nov. 9, 2015 in U.S. Appl. No. 13/488,197.
Office Action dated Oct. 22, 2015 in U.S. Appl. No. 13/489,274.
Office Action dated Nov. 13, 2015 in U.S. Appl. No. 13/489,320.
Office Action dated Nov. 10, 2015 in U.S. Appl. No. 13/489,295.
Notice of Allowance dated Dec. 11, 2015 in U.S. Appl. No. 14/320,091.
Corrected Notice of Allowability dated Dec. 30, 2015 in U.S. Appl. No. 14/320,091.
Notice of Allowance dated Jan. 6, 2016 in U.S. Appl. No. 14/320,263.
Notice of Allowance dated Jan. 6, 2016 in U.S. Appl. No. 14/320,303.
Notice of Allowance dated Jan. 6, 2016 in U.S. Appl. No. 14/320,367.
Notice of Allowance dated Jan. 11, 2016 in U.S. Appl. No. 14/320,153.
Notice of Allowance dated Jan. 13, 2016 in U.S. Appl. No. 14/320,217.
Office Action dated Jan. 22, 2016 in U.S. Appl. No. 13/488,197.
Notice of Allowance dated Jan. 25, 2016 in U.S. Appl. No. 14/320,341.
Final Office Action dated Feb. 1, 2016 in U.S. Appl. No. 13/827,935.
Notice of Allowance dated Feb. 12, 2016 in U.S. Appl. No. 14/319,930.
Notice of Allowance dated Mar. 22, 2016 in U.S. Appl. No. 13/827,935.
Notice of Allowance dated Apr. 5, 2016 in U.S. Appl. No. 14/966,715.
Notice of Allowance dated Apr. 12, 2016 in U.S. Appl. No. 14/966,880.
Final Office Action dated Jun. 16, 2016 in U.S. Appl. No. 13/488,285.
Office Action dated Jun. 21, 2013 in U.S. Appl. No. 13/488,197.
Final Office Action dated Nov. 21, 2013 in U.S. Appl. No. 13/488,197.
Final Office Action dated Aug. 10, 2016 in U.S. Appl. No. 13/489,320.
Final Office Action dated Aug. 11, 2016 in U.S. Appl. No. 13/489,295.
Final Office Action dated Aug. 11, 2016 in U.S. Appl. No. 13/489,340.
Final Office Action dated Aug. 15, 2016 in U.S. Appl. No. 13/488,197.

* cited by examiner

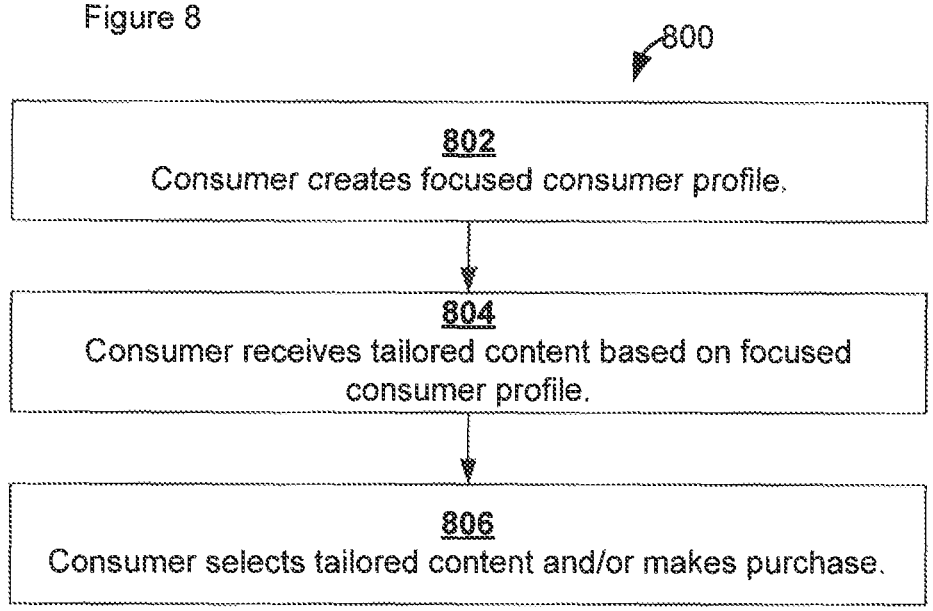

SYSTEMS AND METHODS FOR DELIVERING TAILORED CONTENT BASED UPON A CONSUMER PROFILE

CROSS REFERENCE TO RELATED APPLICATIONS

This application is a continuation of, claims priority to and the benefit of, U.S. Ser. No. 13/488,285 filed on Jun. 4, 2012 and entitled "SYSTEMS AND METHODS FOR DELIVERING TAILORED CONTENT BASED UPON A CONSUMER PROFILE," which is incorporated by reference herein in its entirety.

BACKGROUND

1. Field

The present disclosure generally relates to electronic communication. More particularly, the present disclosure relates to tailored electronic communication.

2. Background

Merchants are often hampered in their marketing efforts by a variety of factors. For instance, consumers are commonly asked to provide a variety of personal information to any merchant with whom they wish to transact (e.g., from whom they wish to receive an offer and/or make a purchase). Such a personal information request may, for example, discourage consumers from dealing with vaguely known or unknown merchants. When consumers elect, in certain circumstances, not to provide personal information to merchants, merchants are typically unable to provide tailored or customized services to these consumers. Thus, for example, merchants with little information about potential customers may conduct inefficient and poorly targeted marketing campaigns.

Moreover, although merchants may capture personal information (e.g., email addresses, phone numbers, etc.), very often, merchants are unable, even with this information, to develop a complete picture of a consumer's preferences. For example, merchants are often unable (even with consumer personal information) to establish preferences like "do not disturb" and/or a preference to receive a certain type of offer and/or a preference not to receive a certain offer or type of offer.

Similarly, although merchants may at times capture some personal information (e.g., email address, name, etc.), it is often difficult for merchants to collect much additional information, for example, information sufficient to develop one or more consumer preferences, because attempts to request additional customer information may overly hamper the checkout process—i.e., consumers may simply find it cumbersome to provide significant amounts of information during checkout.

In addition, as merchants attempt to collect information about their customers, very often this information is regarded as proprietary. Thus, the customer preference data merchants do collect is typically maintained independently by a variety of merchants. Merchants are therefore often unable (even with certain information) to completely understand the preferences of their customers, while consumers are in effect refused (by virtue of the fractured and incomplete picture merchants often have of their preferences) access to relevant and desirable content.

Further, although merchants are able to collect certain information about their customers (e.g., a merchant may collect a name of a customer who makes a purchase at the merchant and the last 4 digits of the customer's transaction account number), typically, the data collected by merchants about their customers is not useful to those merchants. For example, although a merchant may collect a customer's name, transaction account number, dates associated with purchases, and/or purchasing preferences (e.g., a restaurant may know that a customer visits every Monday and orders the same dish from the menu), this information may nevertheless be of little use to the merchant, as the merchant may be unable to communicate with the customer (e.g., although the merchant may know that the customer visits on Monday evenings, it is unlikely that the merchant will know that the customer has actually entered its premises to make a purchase). Thus, the data that merchants are able to collect is often put to little or no use.

Thus, what is needed is a system in which consumers may confidently and safely receive tailored and relevant content, and in which merchants may leverage the personal preferences of consumers to more accurately target and tailor content to those consumers. Further, what is needed is a system in which merchants are provided general, nonspecific, and/or aggregate data about consumers. For example, a system in which merchants receive an age range associated with one or more consumers (as opposed to an exact age associated with those consumers) is needed. In other words, what is needed is a system in which merchants receive profile characteristics or data, but in which the data is aggregate or summary data, as opposed to consumer specific. Thus, a consumer's privacy may be preserved, while merchants are sufficiently equipped to offer tailored, relevant content based upon the user's aggregate profile characteristics.

SUMMARY

The present disclosure includes systems, methods, and article of manufactures for aggregating a consumer profile, identifying tailored content (e.g., in response to a trigger event and/or based upon a consumer profile), and/or tailoring a digital destination. For example, in various embodiments, the systems may receive direct data indicating an interest in receiving specific content, aggregate that data into a consumer profile, compare the consumer profile to content, and/or identify tailored content based upon the comparison. Further, in various embodiments, the systems may communicate the tailored content to a web client associated with a consumer, receive a transaction request from a web client, and/or receive bids associated with tailored content. In addition, these systems may prioritize tailored content comprising a plurality of tailored offers and/or forecast a budget for an upcoming experience.

Further, in various embodiments, the systems may compare content to a consumer profile, identify tailored content based on the comparing, and/or transmit the tailored content to a data partner system (e.g., in response to selection by a consumer of an option to tailor a digital destination), wherein the data partner system tailors the digital destination based on the tailored content. In addition, in various embodiments, the systems may transmit a consumer profile to a data partner system, whereupon the data partner system may tailor a digital destination based upon the consumer profile. Further, in various embodiments, the systems may authenticate a consumer to a consumer account associated with a consumer profile, identify tailored content based upon a match between content and a preference associated with a consumer profile, and/or receive a transaction request from a web client associated with a consumer.

Further still, in various embodiments, the systems may receive one or more of direct data and/or indirect data, and/or aggregate a consumer profile based upon the direct and/or indirect data. Additionally, these systems may receive a specific preference from a consumer, determine a pattern and/or a preference associated with direct and/or indirect data and/or determine that a threshold amount of purchases associated with a consumer are associated with a consumer preference. Aggregation of a consumer profile may further comprise determining that a consumer browses to a digital destination associated with a consumer preference, and a consumer profile may be ranked and/or updated based upon feedback data.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

FIG. 8 shows a flowchart depicting an exemplary process for delivering tailored content to consumers in accordance with various embodiments.

DETAILED DESCRIPTION

Figure 1:
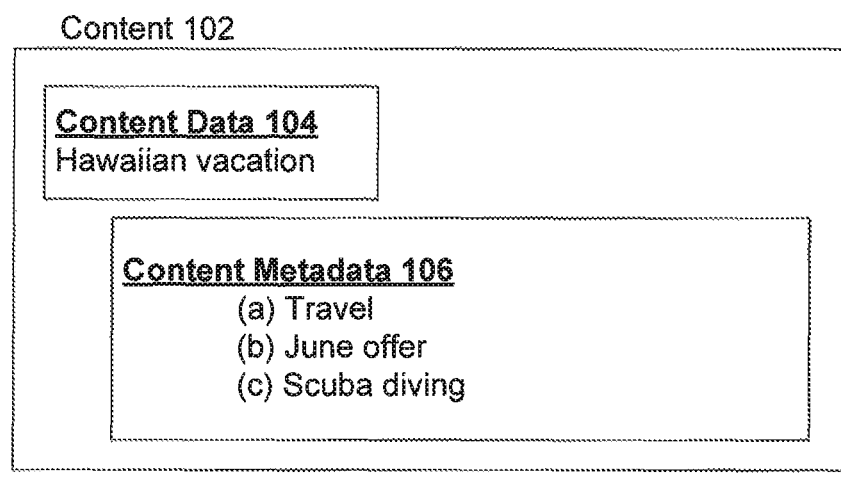
FIG. 1 shows a logical representation of content in accordance with various embodiments.

Systems for delivering tailored content to consumers are disclosed. More particularly, in various embodiments, systems in which consumers receive tailored content based upon consumer profile data are disclosed.

The detailed description of exemplary embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, terms such as "consumer" and "customer" may refer to any individual, group, entity, organization, machine, hardware, software, business, and/or combination of these.

The phrases consumer, customer, user, account holder, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, an transaction account user, an account affiliate, a child account user, a subsidiary account user, a beneficiary of an account, a custodian of an account, and/or any other person or entity affiliated or associated with a transaction account.

For instance, a "consumer" may comprise any individual who interfaces with a system for delivering tailored content (e.g., system 300). A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like. In various embodiments, a merchant may request payment for goods sold to a customer or consumer who holds an account with a transaction account issuer.

As used herein, the phrase "data partner" may refer to any person, entity, distributor system, merchant, business, software and/or hardware that receives data from, transmits data to, and/or exchanges data with another person, entity, distributor system, trusted system, software and/or hardware. In various embodiments, the phrase "data partner" may refer to a business or merchant that transmits data to, receives data from, and/or exchanges data with a trusted system, as described more fully below. A data partner may comprise a merchant and/or a restaurant.

As used herein, "transmit," "communicate" and/or "deliver" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, activity, data, content, access, rental, lease, contribution, account, credit, debit, benefit, right, reward, points, coupons, credits, monetary equivalent, anything of value, something of minimal or no value, monetary value, non-monetary value and/or the like. In various embodiments, items may include "menu items," such as, for example, food and other consumable goods, services related to foods and/or consumable goods, and the like.

As used herein, "content" may comprise any data and/or information. Content may comprise one or more items and/or data associated with one or more items, as discussed elsewhere herein. Content may further comprise one or more characteristics or metadata. The characteristics or metadata associated with content may describe one or more attributes associated with the content.

For illustrative purposes, and with reference to FIG. 1, a logical representation of content 102 is shown. In various embodiments, content 102 may comprise content data 104. Content data 104 may provide information about content (e.g., a general description of content, such as a name of the item associated with the content). Thus, for example, content data 104 may specify that content 102 is related to a "Hawaiian vacation" (e.g., content 102 may comprise an offer for a Hawaiian vacation). Content may comprise menu content. Menu content may, in various embodiments, comprise content related to one or more menu items as described in U.S. Ser. No. 13/488,197, filed on Jun. 4, 2012 and entitled "SYSTEMS AND METHODS FOR DELIVERING TAILORED MENU CONTENT BASED UPON A CONSUMER PROFILE," which is hereby incorporated by reference. Content 102 may further comprise one or more characteristics or content metadata 106. Content metadata 106 may provide additional information about content (e.g., one or more attributes or characteristics associated with the content). For example, where content data 104 may broadly indicate that content 102 is related to a "Hawaiian vacation," content metadata 106 may more particularly indicate that content 102 is also associated with "Travel," a "June offer," and/or "Scuba diving."

In various embodiments, a system may "identify" tailored content by creating content, analyzing content in relation to and/or in association with (e.g., based upon) consumer profile data, looking content up and/or locating or identifying content in a database, flat file, and/or lookup table, any combination of these, and/or the like.

The phrase "digital destination" may refer to any content that is presented electronically and/or capable of being presented electronically. For example, a digital destination may comprise a website, a uniform resource locator ("URL"), a document (e.g., a Microsoft Word document, a Microsoft Excel document, an Adobe .pdf document, etc.), an "ebook," an "magazine," an application or microapplication (as described herein), a text message, an email, and the like. In various embodiments, a digital destination may be hosted or provided by a data partner.

Figure 2:
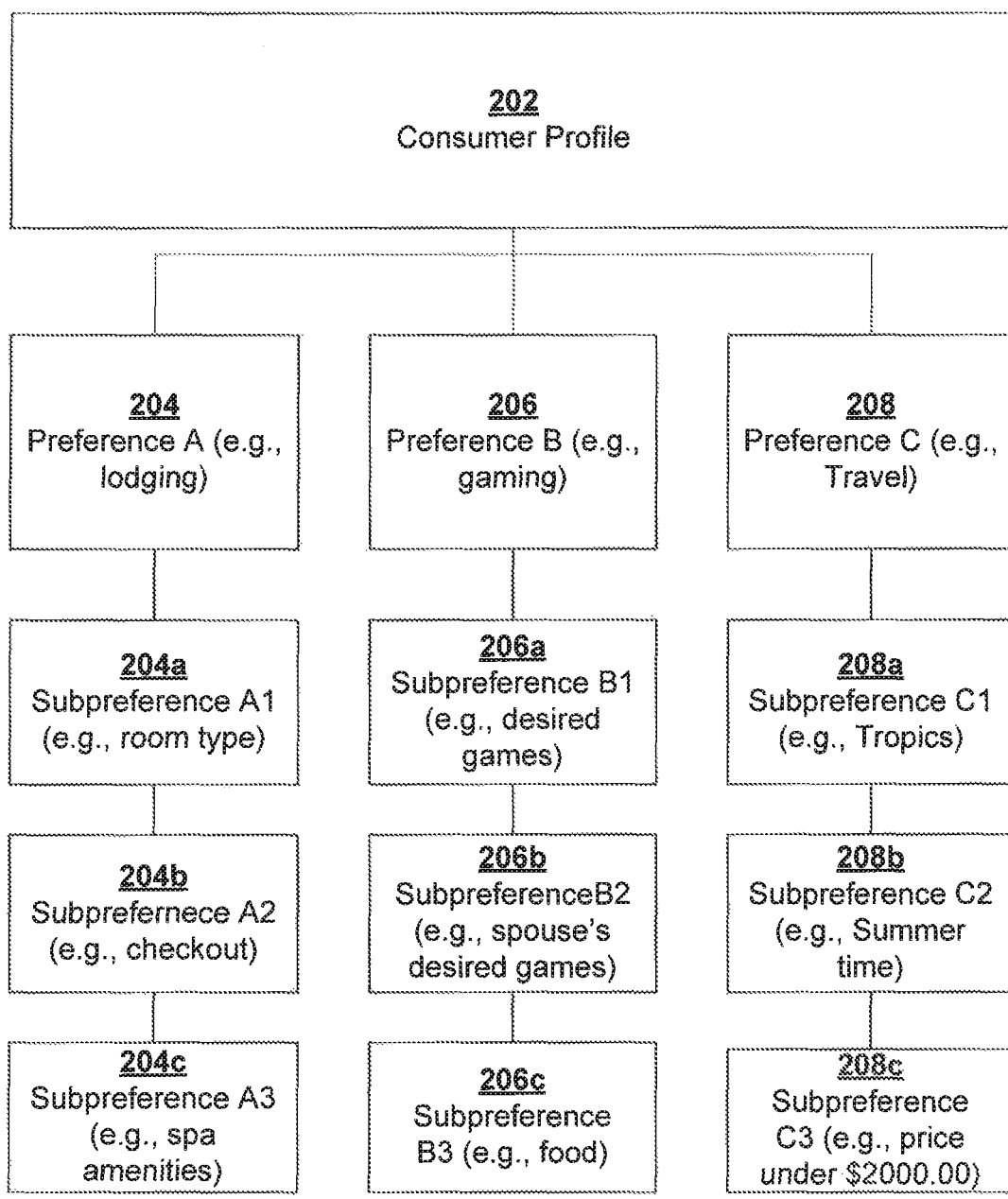
FIG. 2 shows a logical representation of a consumer profile in accordance with various embodiments.

A "consumer profile" or "consumer profile data" may comprise any information or data about a consumer that describes a preference and/or interest of the consumer. For illustrative purposes, a logical representation of an exemplary consumer profile or consumer profile data is depicted at FIG. 2. However, FIG. 2 should be regarded as illustrative only. Consumer profile data may be organized in other ways, all of which are contemplated by the present disclosure. Therefore, as shown, consumer profile 202 may be organized as a set of relational data, and this data may be saved, for example, in a database structure (e.g., a consumer profile database). Thus, consumer profile 202 may comprise one or more categories or preferences (e.g., preferences 204-208), each of which may be related to an item and/or content in which a consumer may have an interest. As also shown, each preference 204-208 may comprise one or more subcategories or subpreferences (e.g., subpreferences 204a-c, 206a-c, and/or 208a-c). Each subpreference may describe an additional feature associated with each preference and/or a more detailed preference. Thus, for example, where a preference 204 describes a consumer's lodging preferences, a first subpreference 204a may describe a preference associated with a room type (e.g., smoking, non-smoking, bed size/type, etc.). Similarly, a second subpreference 204b may describe a preference associated with checkout (e.g., late checkout, early checkout, etc.), while a third subpreference 204c may describe a consumer's preferences associated with spa amenities (e.g., massage, pool, etc.)

In various embodiments, a consumer profile may include certain personally identifying information (or "PII") and/or other information associated with a consumer, all or part of which may be useful for filling out or entering data in a web based form. However, in various embodiments, a consumer profile may not include PII. Where a consumer profile includes PII, however, a consumer may leverage a consumer profile to automatically enter data in a web based form. For instance, a consumer may authenticate to a consumer account, where in response, the consumer may select an option displayed by a digital destination and/or a web based form to automatically populate (or "auto-populate") the form based on the consumer profile.

In various embodiments, a consumer profile or consumer profile data may be based upon a variety of data. For example, a consumer profile may be based upon "indirect data" and/or "direct data."

"Indirect data" may comprise data that is received, culled, collected, and/or derived from a variety of sources, such as a consumer's transaction history or transaction data (e.g., a consumer's travel history, data about what a consumer purchases or purchase transaction data, data about where a consumer makes purchases, data about how much a consumer spends on one or more items like vacations or trips, and the like), location data (as described below), data associated with or available via a consumer's social networking profile (e.g., a consumer's FACEBOOK profile), data associated with a customer's physical location or location data, demographic data, and/or other publicly and/or privately available sources of information about a consumer. In various embodiments, a consumer profile may not be derived from and/or based upon indirect data unless a consumer opts in or requests that indirect data be used.

"Direct data" may comprise data contributed by a consumer ("consumer contributed data") and/or data contributed by a data partner ("data partner contributed data"). In various embodiments, consumer contributed data may comprise data contributed by a consumer such as location data, a consumer's personal information, e.g., a consumer's demographic data, a consumer's date of birth, a consumer's residence information, a specific preference associated with the consumer (e.g., a preference for a certain type of vacation, e.g., a preference for a tropical vacation), a digital destination in which the consumer is interested, and the like. Similarly, in various embodiments, data partner contributed data may comprise data contributed by a data partner, such as a purchase that a consumer made from the data partner (e.g., where the NEW YORK TIMES is a data partner, data partner contributed data may comprise information about which articles a consumer selected via the data partner website), location data, and the like. Thus, in general, consumer contributed data may comprise any data or information that a consumer contributes or enters (e.g., via a web client), while data partner contributed data may comprise any data or information that a data partner contributes or enters.

With respect to the types of direct data a consumer may contribute, in general, a consumer may contribute any information that the consumer would like to serve as a basis for a consumer profile. For instance, a consumer may contribute location data (e.g., data associated with a global positioning system, a home address, a work address, family location data, data about a consumer's most shopped or favorite shopping locations, data about a consumer's most visited or favorite places, and the like), data associated with a consumer's favorite websites or digital destinations (e.g., blogs, news websites, shopping websites, research websites, financial websites, etc.), personal data (e.g., email addresses, physical addresses, phone numbers, age information, income information, expenses information, etc.), data associated with a consumer's status or mode of travel (e.g., vacation data, business data, personal data, airline data, lodging data, etc.), data associated with a consumer's favorite items (e.g., food, restaurants, groceries, electronics, music, gaming, clothing types, hobbies, fitness, etc.), and the like.

With further regard to location data, data of this type may be collected in varying granularity. For instance, location data may be collected in real time (or nearly real time) and/or location data may be collected about a consumer after a certain period of time (e.g., an various embodiments, after several hours or days have passed since the consumer was in a location). Similarly, location data may be collected based on a precise or pinpoint location of a consumer (e.g., within several meters or city blocks of the consumer's actual physical location) and/or based on a more broadly circumscribed location of a consumer (e.g., several miles, within a particular city or zipcode, and the like). Thus, in various embodiments, a consumer's privacy may be protected by a time lapse between a consumer's actual physical presence in a location and collection of location data as well as by a more or less granular determination of a consumer's location.

With respect to the types of direct data a data partner and/or data partner system 108 may contribute toward a consumer profile, in various embodiments, exemplary data may include demographic data, location data, online tracking cookie data, web beacon data, web tracking data, web packet trace data, digital fingerprint data, clickstream data, purchase or transaction history data, data entered by a consumer in a web based form, data purchased by the data partner about the consumer, social networking data, banking and/or credit card data, stock keeping unit ("SKU") data, transactional and/or budget data, coupon data, retail data (e.g., items purchased, wish lists, etc.), data from third party personal data aggregators, search engine data, and/or any other data which the data partner may have in its possession or to which the data partner may gain access.

In various embodiments, a consumer may specify that a consumer profile may be based upon certain direct and/or indirect data, but that the profile should not be based upon other direct and/or indirect data. For example, a consumer may specify that the consumer's profile may be based upon data associated with the consumer's transaction history, but may not be based upon data culled from the consumer's social networking profile.

Phrases and terms similar to "account," "transaction account," "account," "account number," "account code," and/or "consumer account" may include any account that may be used to facilitate a financial transaction. These accounts may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with as rewards account, charge account, credit account, debit account, prepaid account, telephone card, embossed card, smart card, magnetic stripe card, bar code card, transponder, radio frequency card or an associated account.

In general, tailored content may be identified for and/or delivered to consumers based upon a variety of analyses which may be performed by a variety of systems. For example, tailored content may be identified based upon an analysis performed by a trusted system (e.g., a system owned by a transaction account issuer, such as American Express Travel Related Services Company, Inc., which maintains closed loop or internal data, as described elsewhere herein). In various embodiments, tailored content may be identified based upon an analysis performed by a data partner system. Moreover, in various embodiments (e.g., where a data partner system performs an analysis), the analysis may be based upon consumer profile data, which a trusted system may supply or transmit to the data partner system. Likewise, in various embodiments (e.g., where a trusted system performs an analysis), the analysis may be based upon content supplied or transmitted to the trusted system by a data partner system. Further still, tailored content may be identified based both upon an analysis performed by a data partner system as well as an analysis performed by a trusted system.

Figure 3:
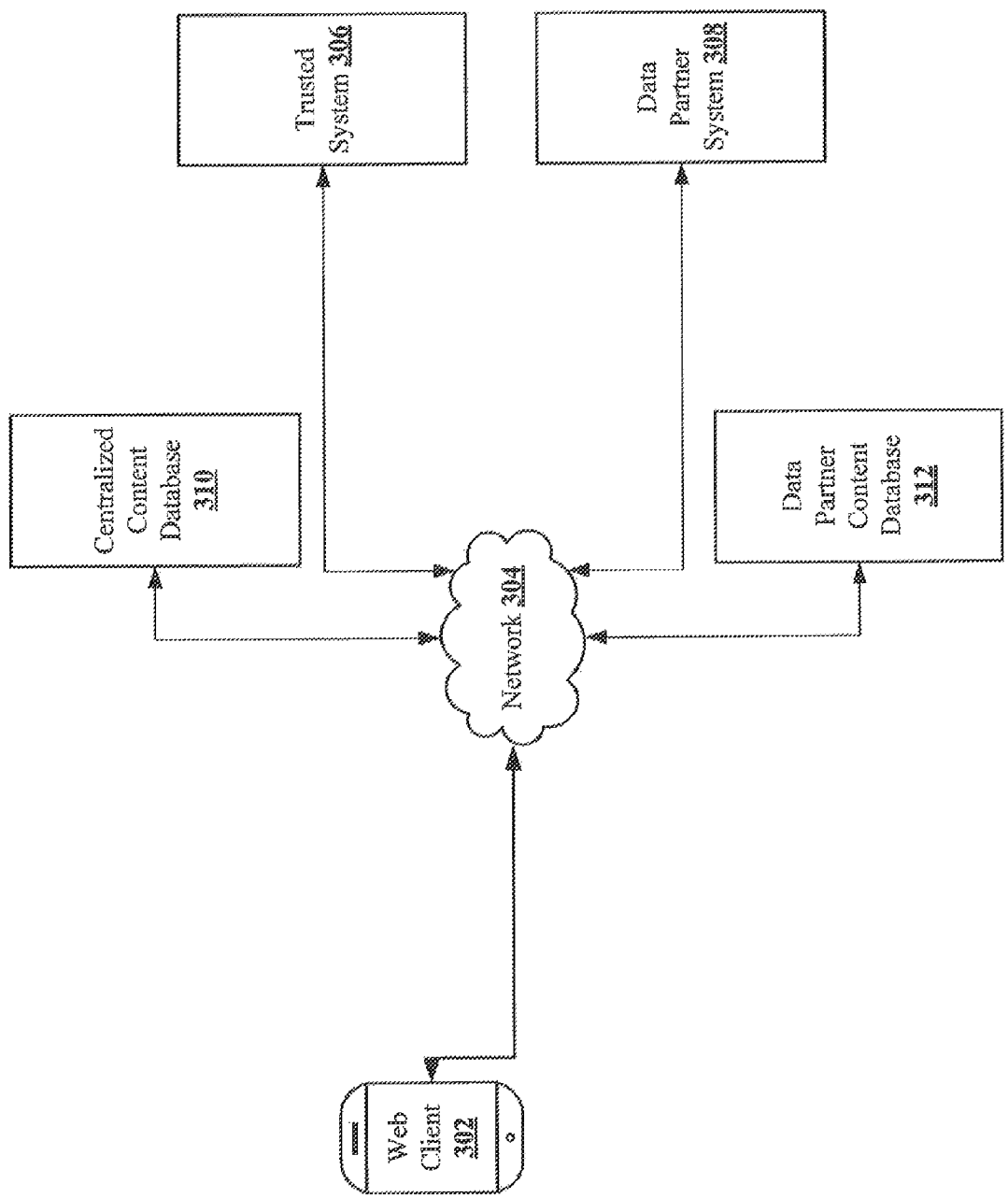
FIG. 3 shows an exemplary system diagram in accordance with various embodiments.

Accordingly, and with reference to FIG. 3, an exemplary system 300 for aggregating consumer profile data and/or identifying tailored content is disclosed. In various embodiments, system 300 may comprise a web client 302, a network 304, a trusted system 306, a data partner system 308, a centralized content database 310, and/or a merchant content database 312.

Web client 302 may include any device (e.g., a personal computer, a mobile communications device, and the like) which communicates via any network, for example such as those discussed herein. Web client 302 may include one or more browsers or browser applications and/or application programs, including browser applications comprising Internet browsing software installed within a computing unit or a system to conduct online transactions and/or communications. For example, in various embodiments, web client 302 may include (and run) Microsoft Internet Explorer, Mozilla Firefox, Google Chrome, fipple Safari, and/or any software package available for browsing the Internet.

A computing unit or system may take the form of a computer or set of computers, although other types of computing units or systems may be used, including tablets, laptops, notebooks, hand held computers, personal digital assistants, cellular phones, smart phones, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, GPS receivers, in-dash vehicle displays, and/or any other device capable of receiving data over a network. The computing unit of the web client 302 may be further equipped with an Internet browser connected to the Internet or an intranet using standard dial-up, cable, DSL or any other Internet protocol known in the art. Transactions originating at a web client 302 may pass through a firewall in order to prevent unauthorized access from users of other networks. Further, additional firewalls may be deployed between the varying components of system 300 to further enhance security.

Web client 302 may or may not be in direct contact with an application server. For example, web client 302 may access the services of an application server through another server and/or hardware component, which may have a direct or indirect connection to an Internet server. For example, web client 302 may communicate with an application server via a load balancer and/or a web server. In an exemplary embodiment, access is through a network or the Internet through a commercially-available web-browser software package.

Web client 302 may further include an operating system (e.g., Windows NT/95/98/2000/XP/Vista/7/8/CE/Mobile, OS2, UNIX, Linux, Solaris, MacOS, PalmOS, etc.) as well as various conventional support software and drivers typically associated with computers. Web client 302 may be in a home or business environment with access to a network. Web client 302 may implement security protocols such as Secure Sockets Layer (SSL) and Transport Layer Security (TLS). Web client 302 may further implement several application layer protocols including hap, ftp, and sftp.

Network 304 may include any electronic communications system or method which incorporates hardware and/or software components (e.g. a "cloud" or "cloud computing" system, as described herein). Communication among parties via network 304 may be accomplished through any suitable communication channels, such as, for example, a telephone network, an extranet, an intranet, Internet, point of interaction device (point of sale device, personal digital assistant (e.g., IPHONE, PALM PILOT, BLACKBERRY), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system 300 is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If network 304 is in the nature of a public network, such as the Internet, it may be advantageous to presume network 304 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently and separately or collectively suitably coupled to network 304 via data links which include, for example, a connection to an Internet Service Provider (ISIS) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that network 304 may be implemented variously, such as, for example, as an interactive television (ITV) network. Moreover, this disclosure contemplates the use, sale or distribution of any goods, services or information over any network having similar functionality described herein.

As used herein, a "cloud" or "cloud computing" may describe a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

Trusted system 306 may comprise hardware and/or software configured to aggregate a consumer profile and/or identify tailored content based upon a consumer profile. In various embodiments, trusted system 306 may be associated with a transaction account issuer (e.g., American Express, Visa, Mastercard, etc.). Moreover, in certain embodiments (e.g., where trusted system is associated with American Express), trusted system 306 may comprise a variety of "closed loop" transaction data associated with a consumer (e.g., as described elsewhere herein). In various embodiments, trusted system 306 may comprise a three-tiered server architecture. For example, trusted system 306 may comprise a web server, an application server, and/or a profile database.

A profile database may comprise hardware and/or software configured to store data. For example, a profile database may comprise a server appliance running a suitable server operating system (e.g., MICROSOFT INTERNET INFORMATION SERVICES or, "IIS") and having database software (e.g., Oracle) installed thereon. In various embodiments, a profile database may store consumer profile data. As described elsewhere herein, consumer profile data may include data associated with a consumer's preferences (e.g., preferences for certain activities, preferences for certain experiences, preferences for certain items and/or types of items (e.g., menu items), preferences for certain locations, and/or the like.

Data partner system 308 may comprise any hardware and/or software associated with and/or owned and/or operated by a data partner, as described above. In various embodiments, data partner system 308 may comprise a web client, a web server, and/or an application server. Data partner system 308 may communicate over network 304. In various embodiments, data partner system 308 may communicate with web client 302 via network 304 to identify and/or deliver tailored content based upon member profile data.

A centralized content database 310 may comprise any hardware and/or software configured to store data. For example, centralized content database 310 may comprise a server appliance running a suitable server operating system (e.g., IIS) and having database software (e.g., Oracle) installed thereon. Centralized content database 310 may store content, which may be uploaded or transmitted to centralized content database 310 by one or more data partner (e.g., merchant) systems. Thus, centralized content database 310 may store content for (or associated with) a variety of merchant systems. Moreover, in various embodiments, centralized content database 310 may be coupled directly to trusted system 306 and/or to network 304. Thus, centralized content database 310 may physically reside in a variety of locations.

A data partner content database 312 may comprise any hardware and/or software configured to store data. For example, data partner content database 312 may comprise a server appliance running a suitable server operating system (e.g., IIS) and having database software (e.g., Oracle) installed thereon. Data partner content database 312 may store content uploaded or transmitted by a single data partner (e.g., merchant) system. Moreover, in various embodiments, data partner content database 312 may be coupled directly to trusted system 306 and/or to network 304. Thus, data partner content database 310 may physically reside in a variety of locations.

Referring broadly now to FIGS. 4-8, the process flows, logical representations, and/or screen shots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 4-8 but also to the various system components and/or logical representations as described above with reference to FIGS. 1-3.

Figure 4:
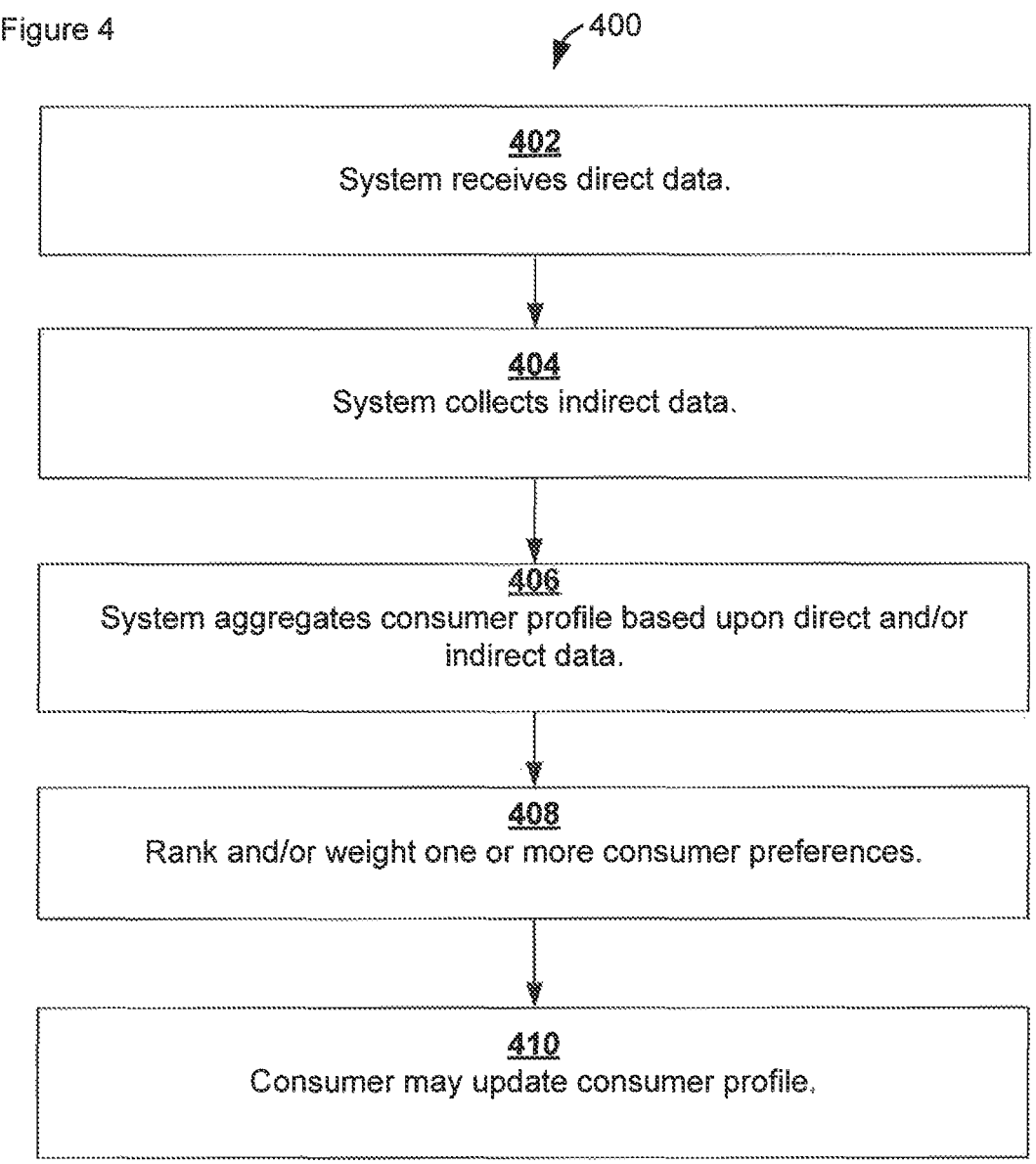
FIG. 4 shows a flowchart depicting an exemplary process for aggregating a consumer profile.

With reference now to FIG. 4, a process 400 for aggregating a consumer profile, or consumer profile data, is described. In general, a consumer profile may be based upon direct and/or indirect data. Thus, as shown, trusted system 306 may receive direct data (as described elsewhere herein), and/or trusted system 306 may receive or collect indirect data (as described elsewhere herein) (steps 402 and 404). For example, trusted system 306 may receive from a consumer (e.g., a consumer operating a web client 302) a particular preference or interest of the consumer (e.g., an interest in a tropical vacation), and/or trusted system 306 may, receive or collect data associated with a consumer's transaction history, from which trusted system 306 may determine, in various embodiments, that the consumer has a particular preference or interest (e.g., because the consumer's transaction history shows a pattern of vacationing in tropical locales during the summertime, trusted system 306 may infer or determine based upon the transaction history that the consumer is interested in vacationing in such locales during the summertime).

A consumer may contribute direct data, in various embodiments, by registering to receive a consumer account and/or authenticating (e.g., using a standard two factor authentication process, such as a username and password) to an existing consumer account. A consumer account may give access to and/or be associated with a consumer profile. Thus, in various embodiments, a consumer may register for and/or authenticate to a consumer account, and, having done so, the consumer may contribute direct data. In various embodiments, trusted system 306 may perform the authentication and/or validate the consumer account.

In various embodiments, a consumer may authenticate to a consumer account by selecting an option (e.g., a "button" displayed as part of a web-based interface and/or a digital destination) to authenticate to a consumer account from a digital destination. Further, a consumer may remain authenticated to the consumer's account for a specified period of time (e.g., twenty-four hours). Thus, trusted system 306 may facilitate a "single sign on" process or event.

A data partner or a data partner system 308 (which may both be referred to herein, for simplicity, as data partner system 308) may contribute direct data, in various embodiments, toward a consumer preference in a variety of ways. For example, data partner system 308 may register to receive a data partner account and/or authenticate (e.g., using a standard two factor authentication process, such as a username and password) to an existing data partner account. A data partner account may permit data partner system 308 to transmit data associated with a consumer to trusted system 306. A data partner account may further, in various embodiments, permit data partner system 308 to receive a consumer profile. Likewise, as described above, a data partner may authenticate to a data partner account by way of a "single sign on" process or event.

Thus, in various embodiments, data partner system 308 may register for and/or authenticate to a data partner account prior to transmitting data associated with a consumer. In various embodiments, trusted system 306 may perform the authentication and/or validate the data partner account. Further, in various embodiments, data partner system 308 may not register for and/or authenticate to a data partner account. Rather, data partner system 308 may simply transmit data associated with a consumer to trusted system 306 (e.g., without authenticating to a data partner account). In various embodiments, trusted system 306 may validate a data partner account and/or validate data transmitted to trusted system 306 by data partner system 308.

With continuing reference to FIG. 4, having received direct and/or collected indirect data, trusted system 306 may aggregate the direct and/or indirect data to generate a consumer profile (step 406). In various embodiments, aggregation of direct and/or indirect data may comprise analyzing, by trusted system 306, direct and/or indirect data to identify or determine one or more patterns and/or preferences in and/or associated with the data. Although innumerable patterns and/or preferences may be identified, several examples are shown below to illustrate an aggregation process.

Accordingly, and for example, trusted system 306 may aggregate a consumer's transaction account history (e.g., as described herein) to determine that a threshold percentage or amount of a consumer's purchases were made with respect to (or may be associated with) a particular consumer preference and/or subpreference. More particularly, trusted system 306 may, in various embodiments, determine that a threshold percentage or amount of a consumer's purchases may be associated with a consumer preference, such as "Travel," which may indicate that a consumer spends or has spent in the past at least the threshold percentage on the consumer preference (e.g., across the consumer's total transactional history during a specified time period), and/or that the consumer has spent at least the threshold amount on items related to the particular consumer preference (e.g., where the preference is "Travel," related items may comprise vacations, hotel reservations, guidebooks, etc.)

Trusted system 306 may similarly determine, for example, that a consumer has contributed data associated with a specific interest or preference. For example, trusted system 306 may determine that a consumer has specifically contributed an interest in a consumer preference such as "Gaming" and/or items related to gaming. Where trusted system 306 identifies a specific interest, trusted system 306 may aggregate the interest as part of a consumer profile.

Further, in various embodiments, trusted system 306 may determine, e.g., based upon data partner contributed data that a consumer often browses to digital destinations associated with a consumer preference such as "Travel," and/or trusted system 306 may "scrape," parse, and/or index a digital destination to identify one or more consumer preferences which may be associated with the digital destination (e.g., the NEW YORK TIMES website may comprise a digital destination, and scraping the website may yield preferences for travel, scuba diving, tropical vacations, etc.)

Thus, trusted system 306 may determine, based upon an aggregation of direct and/or indirect data, that a consumer has one or more interests in one or more consumer preferences. Additionally, in various embodiments, trusted system 306 and/or data partner system 308 may delete any direct and/or indirect data relied upon for the aggregation of a consumer profile. Thus, consumers may be assured that their privacy is protected and that only their consumer profile is stored by trusted system 306. In addition, a consumer profile may comprise summary data and/or data that is not personally identifying. For example, a consumer profile may comprise an age range of a consumer as opposed to a specific age of the consumer. Thus, a consumer's privacy may be further protected where a consumer profile is limited to summary or non-personally identifying information.

In various embodiments, trusted system 306 may further rank consumer preferences (step 408). For instance, trusted system 306 may rank one or more consumer preferences and/or subpreferences based upon one or more rules. In various embodiments, trusted system 306 may rank consumer preferences according to a percentage and/or an amount of spending associated with a consumer preference (e.g., a preference associated with a highest percentage and/or spending amount may be ranked as a highest or most significant preference, while a preference associated with a lower percentage and/or spending amount may be ranked as a lower or less significant preference). Similarly, in various embodiments (e.g., where a consumer specifically contributes a preference), a consumer may contribute a consumer preference as well as associate a ranking (e.g., highest to lowest, a number of stars or thumbs up, a numerical scale, and the like) with a contributed consumer preference.

Moreover, in various embodiments (e.g., where a consumer preference is based upon a behavior of a consumer), a consumer preference may be ranked based upon, for example, a frequency of the behavior. For instance, a ranking for a preference associated with a particular digital destination may be based upon a frequency with which a consumer browses to or visits the destination (e.g., more frequently browsed and/or visited destinations may be ranked higher or as more significant than less frequently browsed or visited destinations).

Further, in various embodiments, a preference and/or subpreference may be weighted (step 408). For instance, trusted system 306 may associate a preference and/or subpreference with a weight indicating how strongly a consumer prefers content (and/or an item) associated with the preference or subpreference. For example, trusted system 306 may calculate a weight to associate with the preference and/or subpreference based upon all or a portion of the direct and/or indirect data upon which the preference is based. Thus, where for example a consumer's transaction history suggests a preference for tropical vacations, trusted system 306 may determine that, based upon the consumer's transaction history (and/or other data), a weight of 75% should be associated with the preference for tropical vacations. A weight of 75% may indicate, for example, that trusted system 306 estimates and/or calculates that the consumer will accept an offer related to a tropical vacation 75% of the time and/or that the consumer's browsing history indicates that the consumer clicks on or selects content related to tropical vacations approximately 75% of the time. Further, where a consumer receives content based upon a weighted preference, the consumer's reaction to the content (e.g., whether the consumer accepted an offer tailored and delivered to the consumer based upon the preference) may be factored back into the weighting—e.g., the weighting may be reduced in response to an event that suggests the consumer is not interested in the content (e.g., the consumer does not select or click on the content, the consumer does not accept an offer, etc.), and/or the weighting may be increased or remain unaffected by an event that suggests that the consumer is interested in the content (e.g., selection of the content, acceptance of an offer). Thus, in various embodiments, trusted system 106 may aggregate direct and/or indirect data to generate a consumer profile, rank, and/or weight one or more member preferences and/or subpreferences comprising the consumer profile.

In various embodiments, a consumer may not only contribute data toward a consumer profile but update or maintain an existing consumer profile (step 410). More particularly, in various embodiments, a consumer may authenticate to an existing consumer account to specify, for example, that a particular data source should not serve as a basis for a consumer profile and/or that a particular data type should not serve as a basis for a consumer profile. Thus, for example, a consumer may specify that a transaction history associated with the consumer should not serve as a basis for aggregating one or more consumer preferences and/or that a digital destination should not serve as a basis for aggregating one or more consumer preferences. A consumer may further adjust the types of data (as described elsewhere herein) underlying a consumer profile. For example, a consumer may indicate that the consumer's transaction history that occurs on the weekend is not representative of the consumer's interests during the week and that the consumer's weekend transaction history should therefore be excluded from the data used to aggregate the consumer's profile. Further still, a consumer may update a consumer profile to exclude a preference and/or subpreference from the consumer's profile. For example, a consumer who only likes to travel during the summertime may exclude a preference and/or subpreference for travel during the wintertime from the consumer's profile.

Figure 5:
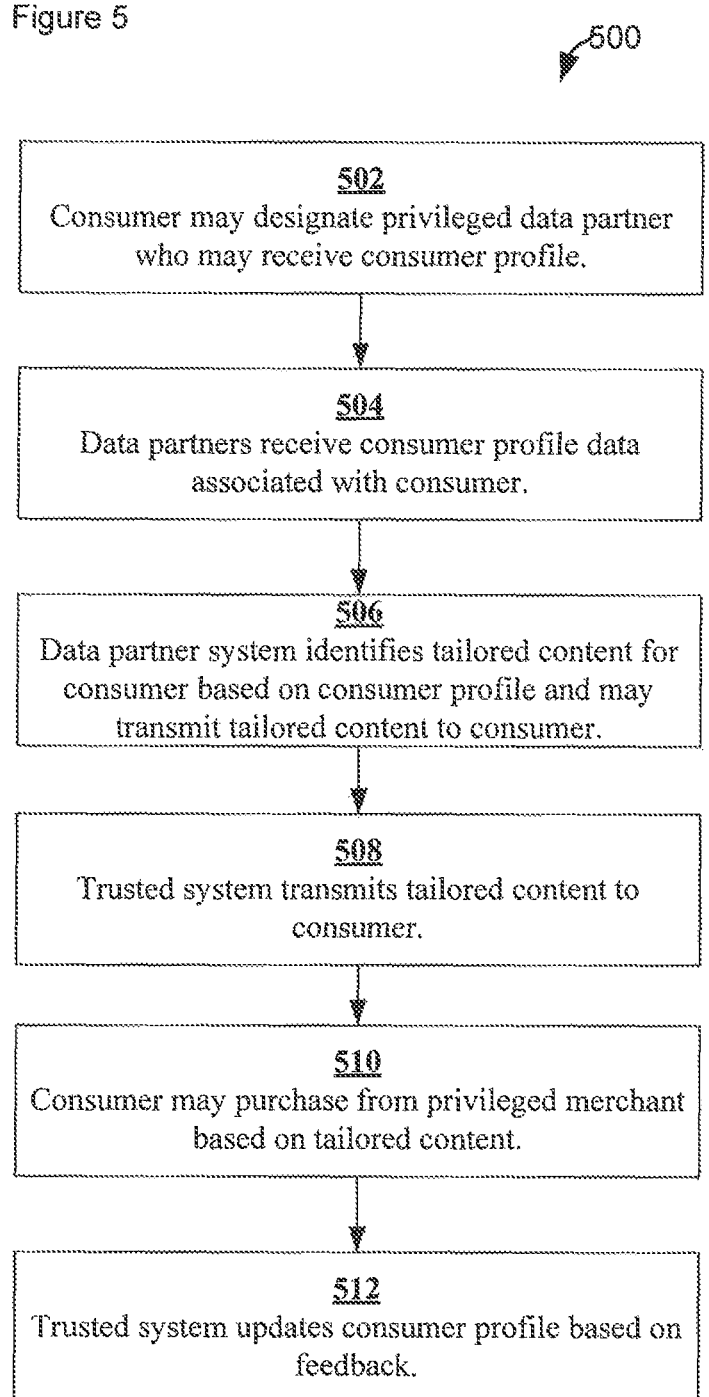
FIG. 5 shows a flowchart depicting an exemplary process for delivering tailored content to consumers in which a data partner system performs an analysis in accordance with various embodiments.

With reference now to FIG. 5, a process 500 for identifying and/or delivering tailored content to a consumer is shown. More particularly, FIG. 5 shows a process 500 in which tailored content may be identified for and/or delivered to a consumer based upon an analysis performed by a data partner system 308 (as opposed to by a trusted system 306, which analysis is described elsewhere herein).

In various embodiments, a consumer may set one or more permissions or flags indicating one or more privileged data partners (e.g., merchants) or privileged types or groups of data partners who are eligible to receive a consumer profile (step 502). For example, a consumer may set a permission indicating that a first data partner (e.g., BANANA REPUBLIC) is eligible to receive a consumer profile. Likewise, a consumer may set a permission indicating that a type of data partner (e.g., merchants who offer lodging) or a group of data partners (e.g., all merchants within a particular location such as a shopping mall) are eligible to receive a consumer profile. A consumer may select privileged data partners based on a variety of considerations. However, in various embodiments, and for purposes of illustration, a consumer may designate data partners as privileged data partners based on a consumer's interest in items offered for sale by certain data partners, a transaction history with certain data partners, a location of certain data partners, and the like.

In various embodiments, a consumer may not, however, designate one or more privileged data partners. Where this is the case, any data partner system 308 may receive a consumer profile. Similarly, a consumer may designate one or more data partners who are not eligible to receive consumer profile data, in which case, any data partner not designated as ineligible to receive consumer profile data may receive consumer profile data. Accordingly, any data partner system 308 that is eligible to receive consumer profile data (whether a consumer specifically designates the data partner system 308 as privileged or the data partner system 308 is simply not designated as ineligible to receive consumer profile data, as described above) may receive a consumer profile (step 504).

Further, in various embodiments, data partner system 308 may receive a consumer profile based upon or in response to a visit by the consumer to the digital destination associated with data partner system 308 (e.g., in response to a consumer participating in a single sign on process and/or in response to an authentication by the consumer to a consumer account). For instance, data partner system 308 may access a consumer tracking cookie stored on web client 302, which may facilitate a request by data partner system 308 to trusted system 306 for a consumer profile. Trusted system 306 may, in response, distribute the requested consumer profile to data partner system 308.

In addition, in various embodiments, data partner system 308 may receive a group or plurality of consumer profiles. Data partner system 308 may receive a group of consumer profiles based upon a consumer preference that each consumer profile shares in common. More particularly, data partner system 308 may not receive all of the consumer profiles associated with consumers currently visiting a digital destination associated with data partner system 308. Rather, data partner system 308 may receive a group of consumer profiles associated with consumers whose profiles include a particular consumer preference or group of consumer preferences. Thus, data partner system 308 may receive a filtered set of consumer profiles based upon, for example, a particular set of consumers to whom a data partner has an interest in delivering tailored content.

Having received a consumer profile, a data partner system 308 may analyze the consumer profile to identify tailored content for a consumer (step 506). More particularly, in various embodiments, data partner system 308 may analyze one or more preferences and/or subpreferences (see FIG. 2 for an illustrative consumer profile) to identify tailored content (see FIG. 1 for illustrative content) for the consumer based upon the consumer profile. For example, data partner system 308 may identify tailored content, such as an offer and/or an advertisement, for a consumer based on a comparison of one or more preferences and/or subpreferences comprising a consumer profile (for example, a preference/subpreference for a particular type of travel 208, 208a-208c) to particular content (for example, content 102). In various embodiments, data partner system 308 may retrieve content for comparison to a consumer profile from a data partner content database 312, as described elsewhere herein. Where a consumer's preferences and/or subpreferences match or are similar (or substantially matching and/or similar) to content and/or metadata associated with the content, a data partner system 308 may determine that the content is tailored and/or identify the content as tailored to the consumer. Thus, a consumer profile may enable the provision and delivery of targeted, relevant, and/or tailored content to a consumer. Such content may be communicated or transmitted directly to a consumer by data partner system 308 (step 506), and/or tailored content may be transmitted by data partner system 308 to trusted system 306 (step 508).

In various embodiments (e.g., where trusted system 306 receives tailored content from data partner system 308, as described above), trusted system 306 may transmit tailored content to a consumer (step 510). For example, in various embodiments, a consumer may view tailored content using web client 302, which may receive tailored content from trusted system 306. Similarly, a consumer may receive tailored content at a physical mail box, via email, via a social networking website, and/or in any other similar manner. Thus, trusted system 306 may protect or shield a consumer and/or PII associated with a consumer from review by data partner system 308 (because, in various embodiments, data partner system 308 must transmit tailored content to trusted system 306 for delivery to a consumer). A consumer may therefore rely on trusted system 306 to protect his identity from theft and/or tampering, which may, as described elsewhere herein, encourage consumers to interact with vaguely known and/or unknown data partners as well as provide a greater source of consumer profile data to data partners, which data partners may use to better tailor content to consumers.

In various embodiments, trusted system 306 may transmit tailored content to a consumer from a variety of data partner systems 308 (each of which may generate tailored content based upon consumer profile data), and/or trusted system 306 may require or facilitate bidding between a variety of data partner systems 308 identifying tailored content. Moreover, in various embodiments, trusted system 306 may transmit, organize, or filter selected tailored content based on a particular criterion and/or set of criteria, e.g., based on a price associated with the tailored content. For instance, where tailored content comprises an offer, a variety of data partner systems 308 may wish to make a consumer an offer for a same, similar, or related item, in which case trusted system 306 may filter or organize tailored content based upon a lowest price or a lowest set of prices. Further, trusted system 306 may accept bids from data partner systems 306 for a specified bidding period, in response to which a lowest bid or group of bids may be transmitted to a consumer.

Further, in various embodiments, data partner system 108 may tailor a digital destination (which may comprise content and/or be regarded as content) based upon a consumer profile. More particularly, data partner system 108 may tailor a digital destination such that content related to one or more consumer preferences is presented to a consumer. For example, data partner system 108 may tailor or personalize a digital destination based upon a consumer profile containing consumer preferences for travel in the tropics during the summertime and at a price under $2000.00 (see, e.g., FIG. 2). Thus, data partner system 308 may display a digital destination tailored to a consumer with the foregoing consumer profile (e.g., the consumer may see content, such as a news article, related to Hawaii or South America, both of which may satisfy or be related to all or a part of the consumer's preferences). In addition, as described elsewhere herein, a digital destination may be customized in response to a single sign on process and/or in response to an authentication by a consumer to a consumer account (e.g., a button "click" and/or a selection of a button or option displayed by a website and/or a web based interface, such as, for example, a button or option to authenticate or "sign in" to a consumer account).

In response to receiving tailored content, a consumer may make a purchase and/or otherwise engage in a transaction with a data partner system (step 510). A transaction may be processed according to a variety of options. For example, trusted system 306 may facilitate a transaction. Where trusted system 306 facilitates a transaction, a consumer's anonymity and security may be further preserved, and/or a consumer may not be required to manually provide to data partner system 308 certain information. For example, trusted system 306 may receive a transaction request from a consumer (e.g., which is based on tailored content), and trusted system 306 may, in response, communicate the consumer's transaction account information (e.g., the consumer's transaction account number) to data partner system 308 for further processing. Similarly, trusted system 306 may, in response to a transaction request, communicate directly with data partner system 308 to process the transaction request, such that data partner system 308 receives payment but is not provided the consumer's transaction account information. For example, trusted system 306 may transmit a transaction request to data partner system 308, and data partner system 308 may, in response, communicate a reply (e.g., indicating that a requested item is in stock or available). In response, trusted system 306 may remit payment to data partner system 308, whereupon data partner system 308 may ship or otherwise make available the purchased item to the consumer.

In various embodiments, trusted system 306 may update a consumer profile based upon feedback and/or feedback data (step 512). Trusted system 306 may receive feedback from data partner system 308, and/or trusted system 306 may receive feedback as part of a consumer's transaction account history. For example, where tailored content is delivered to a consumer, trusted system may compare the consumer's transaction account history over the course of a particular period of time (e.g., the previous month) to tailored content delivered to the consumer during the same time period. Where, for example, the consumer's transaction account history indicates that the consumer purchased an item associated with certain delivered tailored content, trusted system 306 may adjust the consumer's consumer profile (e.g., one or more preferences and/or subpreferences) such that the consumer profile is reinforced or associated with a stronger preference and/or subpreference for content associated with the item. Similarly, where a consumer's transaction account history indicates that a consumer did not purchase an item associated with certain delivered tailored content, trusted system 306 may adjust the consumer's consumer profile such that the consumer profile is not reinforced or associated with a lesser or reduced preference and/or subpreference for content associated with the item. Trusted system may react in similar fashion to feedback received from data partner system 308, except that, for example, data partner system 308 may, in various embodiments, provide feedback as to which tailored content a consumer clicked on or selected ("clickthrough data"). Trusted system 306 may process clickthrough data, as described with reference to transaction history information, to increase or decrease a consumer's preference and/or subpreference for content associated with a particular item. Thus, over time, trusted system 306 may "learn" about and/or refine a consumer's preferences and/or subpreferences based upon feedback received in relation to the consumer's purchasing activity, browsing activity, and/or the like.

Further, in various embodiments, trusted system 306 may calculate an effectiveness associated with tailored content (e.g., an effectiveness of an advertisement). For example, trusted system 306 may calculate an effectiveness of tailored content based upon a comparison of a consumer's purchasing activity to the tailored content that was distributed to the consumer. For example, tailored content may be regarded as effective or effectively tailored where a comparison of the tailored content to a consumer's transaction history shows that the consumer was exposed to the tailored content and soon thereafter or later purchased an item related to the tailored content. Moreover, in various embodiments, trusted system 306 may evaluate a consumer's transaction history to ascertain a purchase objective associated with the consumer (e.g., business, pleasure, luxury, necessity, gift, and the like).

Thus, with system 100, consumers may receive tailored content based upon a consumer profile. In various embodiments, consumers may designate privileged data partners with whom they are interested in dealing, and these data partners may alone receive consumer profile data. Further, where consumers wish to make purchases from one or more data partners, system 300 may reduce or eliminate the process of manual data entry typically required (e.g., consumers may not be required to enter shipping and/or billing information, transaction account information, and the like). System 300 may further safeguard consumer privacy during a purchasing process by processing a transaction request such that a data partner system 308 is not provided PII such as, for example, consumer transaction account information.

As described above, in various embodiments, data partner system 308 may not analyze (and/or may not be the only system that analyzes) consumer profile data to identify tailored content for a consumer. Rather, in various embodiments, trusted system 306 may analyze content provided by data partner system 308 to identify or offer tailored content to a consumer.

Figure 6:
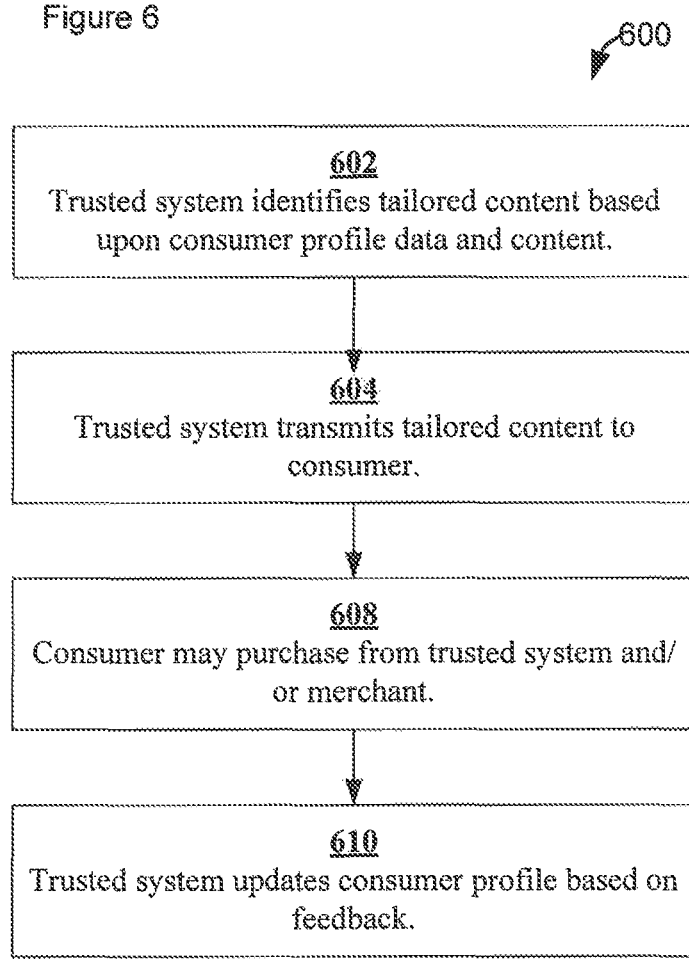
FIG. 6 shows a flowchart depicting an exemplary process for delivering tailored content to consumers in which a trusted system performs an analysis in accordance with various embodiments.

Accordingly, with reference now to FIG. 6, a process 600 for identifying and delivering tailored content based upon an analysis performed by trusted system 306 is shown. In general, process 600 is similar to process 500 (described above), except that trusted system 306 may identify tailored content (as opposed to data partner system 308). Therefore, as described above with respect to process 500, trusted system 306 may, like data partner system 308, identify tailored content based upon a comparison of consumer profile data to content (step 602). More particularly, tailored content may be identified by trusted system 306 by comparing one or more preferences and/or subpreferences included in a consumer profile to one or more characteristics or metadata associated with content. Trusted system 306 may retrieve content for comparison to a consumer profile from centralized content database 310. However, trusted system 306 may also access data partner content database 312 to retrieve content. Accordingly, where one or more preferences and/or subpreferences match or are similar to content and/or metadata associated with the content, trusted system 306 may determine that the content is tailored content and/or identify the content as tailored content. Having identified content that is tailored to a consumer, trusted system 306 may transmit the tailored content to the consumer (step 604), and/or a consumer may make a purchase (as described above, see discussion surrounding step 510) from a data partner system 308 (step 606). In addition, as described above (see discussion surrounding step 512), trusted system 306 may update a consumer profile based upon feedback data.

In various embodiments, trusted system 306 and/or data partner system 308 may identify "featured content" Featured content may comprise tailored content that is transmitted to a consumer, as described elsewhere herein, in addition to tailored content. Featured content may itself comprise tailored content. To illustrate, where tailored content comprises, for example, tailored content associated with travel, featured content may comprise content relevant to a consumer profile that is related to news, weather, sports, offers, and the like (e.g., content that is unrelated or not specifically related to travel). This featured content may be provided or transmitted to a consumer together with other tailored content. Thus, a consumer may receive and/or review tailored content as well as a variety of featured content, such as content related to news, weather, sports, etc. (depending upon the consumer's consumer profile).

Figure 7:
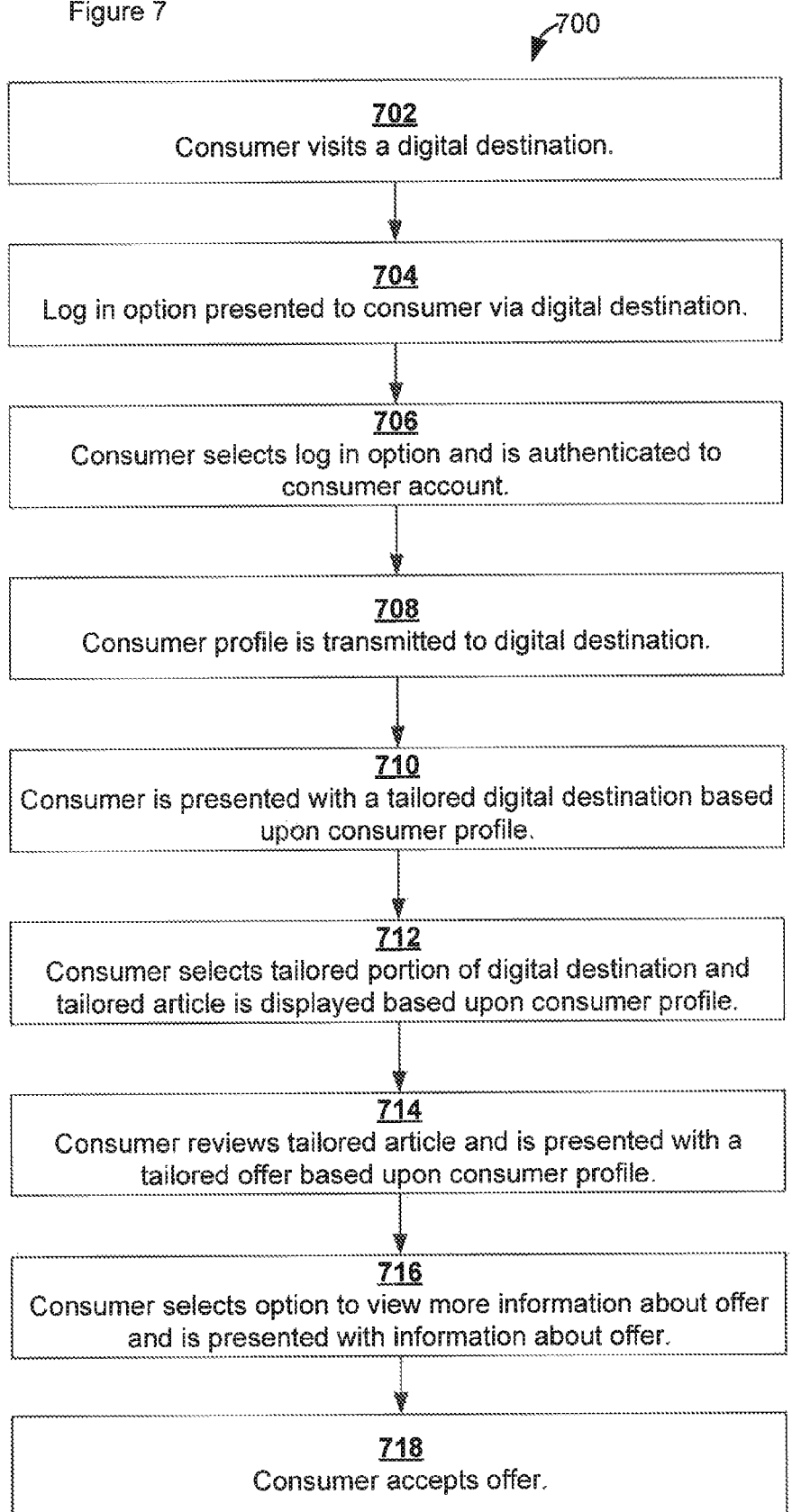
FIG. 7 shows a flowchart depicting an exemplary process for tailoring a digital destination in accordance with various embodiments.

For purposes of illustration, and with reference now to FIG. 7, an example embodiment of system 300, and the operation thereof, is presented. As shown, a consumer may visit a digital destination (e.g., a digital destination hosted by a data partner system 308) (step 702). A consumer may further authenticate to a consumer account (as described elsewhere herein) via a sign in option (e.g., a "button" and/or an interface option) that is presented or displayed by the digital destination (steps 704 and 706).

Moreover, in various embodiments, a consumer may authenticate to a consumer account by way of an option to tailor the digital destination (e.g., "tailor destination"), and/or a consumer may simply select such an option. In response to a successful authentication and/or in response to a selection of an option to tailor a destination (whether the option results in an authentication of the consumer to a consumer account), trusted system 306 may transmit a consumer profile associated with the consumer to data partner system 308. For example, where a consumer selects an option to tailor a digital destination, a consumer profile may be transmitted to a data partner system 308, because the consumer was earlier authenticated to a consumer account (e.g., by way of a single sign on process, as described elsewhere herein), and/or because the consumer is authenticated to a consumer account in response to selection by the consumer of the option to tailor the digital destination.

Based on the consumer profile, data partner system 308 may tailor or personalize the digital destination (e.g., as described elsewhere herein) such that content related to the consumer profile is displayed (step 710). For example, data partner system 308 may tailor a digital destination such that the digital destination includes one or more sections or portions that are based upon the consumer profile. Thus, where for example a consumer profile shows that a consumer is interested in travel, a travel section of the digital destination may be displayed for the consumer. In addition, in various embodiments, tailored content may be identified, as described elsewhere herein, and displayed by a digital destination. Moreover, content (e.g., sections, articles, etc.) that is typically unavailable to individuals who are not associated with consumer profiles may be displayed for a consumer who is associated with a consumer profile.

Further, although in various embodiments, trusted system 306 may transmit a consumer profile to data partner system 308, whereupon data partner system 308 may tailor a digital destination, in various embodiments, trusted system 306 may (as described elsewhere herein) identify tailored content (again, as described elsewhere herein) which may be transmitted by trusted system 306 to data partner system 308. Data partner system 308 may utilize received tailored content to tailor a digital destination, as described above and elsewhere herein. Further, in various embodiments, data partner system 308 may tailor a digital destination, as described above and elsewhere herein, based upon a consumer profile (e.g., relevant sections may be displayed) and/or based upon tailored content. Thus, either or both of data partner system 308 and/or trusted system 306 may, in various embodiments, identify tailored content and/or tailor a digital destination.

In various embodiments (e.g., where a consumer selects a particular section of a tailored digital destination), additional tailored content may be displayed (step 712). For instance, a consumer may be shown a tailored article based upon the consumer profile which may, in various embodiments, also be related to a topic associated with the tailored section selected by the consumer (e.g., travel). Thus, as an example, a consumer may be shown a tailored article that gives a review of a new resort in the Bahamas. As described herein, the tailored article may be identified by data partner system 306 as relevant to the consumer based upon the consumer profile, which may associated with consumer with a preference for travel based upon data showing that the consumer made previous purchases in similar locations (e.g., Hawaii and Florida) as well as that the consumer recently reviewed information and/or one or more reviews associated with the Bahamas via another digital destination (e.g., a travel advisor website).

The consumer may review the tailored article shown by the digital destination, and, in various embodiments, the digital destination may present a tailored offer based upon the consumer's review of the tailored article (step 714). For example, where the tailored article relates, as described above, to a resort in the Bahamas, the consumer may be shown a tailored offer for a vacation package at the resort. The vacation package may include, to illustrate, a four night stay at the resort plus one night free at the resort (for a total of five nights), a discounted companion airfare from the Newark, N.J. airport, and an all day dining pass at the resort). Again, as described herein, the tailored article may be identified by data partner system 306 as relevant to the consumer based upon the consumer profile, which may indicate an interest in travel based upon data, such as, for example, that the consumer has purchased items in the past from one or more similar locations (e.g., Orlando, Miami, etc.), that the consumer tends to stay at least five nights in any resort to which the consumer travels, that the consumer tends to travel with a family member or members for vacation trips, that the consumer has purchased dining packages as part of one or more previous trip purchases, that the consumer typically or often travels from the Newark, N.J. airport, that the consumer has discussed visiting the Bahamas on the consumer's FACEBOOK page, that the consumer typically or often takes vacations during the summertime, which is approaching, that the consumer appeared to be interested in the tailored article based upon the fact that the consumer lingered for several minutes on the tailored article (suggesting that the consumer read all or a portion of the tailored article), and/or the like.

Having received the tailored offer, the consumer may, in various embodiments, select an option to view more information about the offer, which may cause the digital destination to show the consumer, for example, terms and conditions associated with the offer, detailed information about the offer, an option to book the vacation package associated with the offer, and the like (step 716). The consumer may, in addition, book the vacation package through the digital destination and/or through the consumer's account, as described herein (step 718).

For purposes of illustration, and with reference now to FIG. 8, an example embodiment of system 300, and the operation thereof, is presented. Accordingly, in various embodiments, a consumer may manipulate a consumer profile to actively solicit or locate content in which the consumer is interested. In other words, a consumer may contribute data to a consumer profile according to content in which the consumer is interested (step 802). Thus, a consumer may, for example, plan an experience in which the consumer is interested by manipulating a consumer profile to include preferences for the experience and/or content in which the consumer is interested. For instance, a consumer who is interested in receiving content related to a vacation in Hawaii may contribute data to a consumer profile so that a consumer profile is aggregated in which a first preference is for lodging in Hawaii, a second preference for scuba diving charters, a third preference for dining out on a particular island in the Hawaiian chain of islands, and a fourth preference for departure and return flights. For example, as described elsewhere herein, a consumer may simply contribute a specific preference.

In various embodiments, a consumer profile may be communicated to one or more data partner systems 308, each of which may, as described elsewhere herein, identify and/or bid on tailored content in response (as described elsewhere herein). Similarly, in various embodiments, one or more data partner systems 308 may provide content to a content database 310 and/or 312, as described elsewhere herein, and trusted system 306 identify tailored content in response. In addition, in various embodiments, a list of tailored content may be ordered or prioritized, as described elsewhere herein, so that most relevant content is shown to a consumer first (e.g., toward the top of a list of content), while content that is less relevant is shown to a consumer later in a list (step 804). Further still, in various embodiments, tailored content may be identified for a consumer over a period of time (e.g., several days, weeks, and/or months). Thus, for example, a consumer may review a variety of tailored content (e.g., a variety of vacation offers) over a period of time before deciding on a particular offer to accept (step 806).

Further still, in various embodiments, and as described elsewhere herein, system 300 may identify tailored content for a consumer based upon a trigger event. For example, in various embodiments, system 300 may identify tailored content based upon a trigger event, such as a life event (e.g., an anniversary, a birthday, etc.) and/or a price. A life event and/or a price may, in various embodiments, comprise a part of a consumer profile (e.g., a preference and/or subpreference). Thus, in various embodiments, system 300 may, as described elsewhere herein, identify tailored content based upon a trigger event.

In addition, in various embodiments, a consumer may be able to share past and/or planned experiences (as described elsewhere herein) with other consumers in a social network. For example, a consumer may, in various embodiments, share a past and/or planned experience (e.g., a vacation to Hawaii) with others in the consumer's social network. Similarly, as described elsewhere herein, a consumer's past experiences may contribute to and/or feedback into a consumer profile, which may, in turn, improve the accuracy and value of a consumer profile. Moreover, in various embodiments, although a consumer may have selected a particular experience (e.g., the consumer may have planned a vacation to a particular location), system 300 may incorporate the consumer's future or planned experience into the consumer profile in order to identify content that is similar to the planned experience but which is perhaps more appealing (e.g., system 300 may identify content related to an experience which is less expensive and/or closer to the consumer's residence).

Further still, in various embodiments, system 300 may enable and/or perform budget forecasting. For example, in various embodiments, trusted system 306 may forecast a budget for an upcoming experience based upon an amount spent by a consumer on a particular past experience (e.g., a vacation taken in the past). For instance, trusted system 306 may calculate that a consumer spent a first amount on tickets for a past experience (e.g., a cruise), but that the consumer also spent a second amount during the experience. Thus, trusted system 306 may forecast that the consumer will spend the first amount plus the second amount on the upcoming experience, particularly where the upcoming experience is similar to or the same as the past experience.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

In various embodiments, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firma may implement a demilitarized zone ("DMZ") to facilitate communications with a public network such as the Internet, A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft. Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William. Stallings, published by Prentice Hall; all of which are hereby incorporated by reference.

With further regard to terms such as "consumer," "customer," "merchant," and the like, each of these participants may be equipped with a computing device in order to interact with the system and facilitate online commerce transactions. A consumer or customer may have a computing unit in the form of a personal computer, although other types of computing units may be used including laptops, notebooks, hand held computers, set-top boxes, cellular telephones, touch-tone telephones and the like. A merchant may have a computing unit implemented in the form of a computer-server, although other implementations are contemplated by the system. A bank may have a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein A merchant computer and/or a bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the AMERICAN EXPRESS, VISANET and the VERIPHONE networks.

An electronic commerce system may be implemented at the customer and issuing bank. In an exemplary implementation, the electronic commerce system may be implemented as computer software modules loaded onto the customer computer and the banking computing center. The merchant computer may not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an interne based embodiment, an entirely hardware embodiment, or an embodiment combining aspects of the interne, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perforin the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like, it should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The system may include or interface with any of the foregoing accounts, devices, and/or a transponder and reader (e.g. RID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NEC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NECIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "internal data" or "closed loop data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform. Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for c-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

The invention claimed is:

1. A method comprising:
receiving, by a computer-based system, direct data and indirect data, wherein the direct data includes a cookie identification (ID);
aggregating, by the computer-based system, a consumer profile based upon the direct data and the indirect data, wherein the consumer profile includes a consumer preference associated with a consumer;
receiving, by the computer-based system and from the consumer, a designation that a data partner is not eligible to receive the consumer profile;
receiving, by the computer-based system, a designation that the data partner is eligible to be a privileged data partner and receive the consumer profile, wherein the eligibility is based on the consumer visiting a digital destination of a data partner;
receiving, by the computer-based system and from the consumer, a first software-enabled permission that the data partner is the privileged data partner and eligible to receive the consumer profile;
receiving, by the computer-based system and from the consumer, a second software-enabled permission that a type of the data partner is the privileged data partner and eligible to receive the consumer profile, wherein the type of data partner is based upon at least one of the consumer's interest in items offered for sale by the privileged data partner, a transaction history with the privileged data partner, or a location of the privileged data partner;
selecting, by the computer-based system, a subset of the consumer profiles based on common consumer preferences;
storing, by the computer-based system, the subset of the consumer profiles in a database;
including, by the computer-based system, a key field in the database to speed searches;
tuning, by the computer-based system, the database to optimize database performance,
wherein the tuning includes placing frequently used files on separate file systems to reduce in and out bottlenecks;
receiving, by the computer-based system, consumer tracking cookie information stored on a web client based on the cookie ID; and
transmitting, by the computer-based system, the subset of the consumer profiles to the privileged data partner.

2. The method of claim 1, further comprising receiving, by the computer-based system, the consumer preference from the consumer.

3. The method of claim 1, wherein the aggregating further comprises determining at least one of: a pattern and a preference associated with the direct data and the indirect data.

4. The method of claim 1, wherein the aggregating further comprises determining, by the computer-based system, that a threshold amount of purchases associated with the consumer are associated with the consumer preference.

5. The method of claim 1, wherein the aggregating further comprises determining, by the computer-based system, that the consumer browses to digital destinations associated with the consumer preference.

6. The method of claim 1, further comprising ranking, by the computer-based system, a plurality of the consumer preferences.

7. The method of claim 1, further comprising updating, by the computer-based system, the consumer profile based upon feedback data.

8. A system comprising:
a processor;
a tangible, non-transitory memory communicating with the processor;
the tangible, non-transitory memory having instructions stored thereon that, in response to execution by the processor, cause the processor to perform operations comprising:
receiving, by the processor, direct data and indirect data, wherein the direct data includes a cookie identification (ID);
aggregating, by the processor, a consumer profile based upon the direct data and the indirect data, wherein the consumer profile includes a consumer preference associated with a consumer;
receiving, by the processor and from the consumer, a designation that a data partner is not eligible to receive the consumer profile;
receiving, by the processor, a designation that the data partner is eligible to be a privileged data partner and receive the consumer profile, wherein the eligibility is based on the consumer visiting a digital destination of a data partner;
receiving, by the processor and from the consumer, a first software-enabled permission that the data partner is the privileged data partner and eligible to receive the consumer profile;
receiving, by the processor and from the consumer, a second software-enabled permission that a type of the data partner is the privileged data partner and eligible to receive the consumer profile, wherein the type of data partner is based upon at least one of the consumer's interest in items offered for sale by the privileged data partner, a transaction history with the privileged data partner, or a location of the privileged data partner;
selecting, by the processor, a subset of the consumer profiles based on common consumer preferences;
storing, by the processor, the subset of the consumer profiles in a database;
including, by the processor, a key field in the database to speed searches;
tuning, by the processor, the database to optimize database performance,
wherein the tuning includes placing frequently used files on separate file systems to reduce in and out bottlenecks;
receiving, by the processor, consumer tracking cookie information stored on a web client based on the cookie ID; and
transmitting, by the processor, the subset of the consumer profiles to the privileged data partner.

9. The system of claim 8, further comprising receiving, by the processor, the consumer preference from the consumer.

10. The system of claim 8, wherein the aggregating further comprises determining at least one of: a pattern and a preference associated with the direct data and the indirect data.

11. The system of claim 8, wherein the aggregating further comprises determining, by the processor, that a threshold amount of purchases associated with the consumer are associated with the consumer preference.

12. The system of claim 8, wherein the aggregating further comprises determining, by the processor, that the consumer browses to digital destinations associated with the consumer preference.

13. The system of claim 8, further comprising ranking, by the processor, a plurality of the consumer preferences.

14. The system of claim 8, further comprising updating, by the processor, the consumer profile based upon feedback data.

15. An article of manufacture including a non-transitory, tangible computer readable storage medium having instructions stored thereon that, in response to execution by a computer-based system, cause the computer-based system to perform operations comprising:
receiving, by the computer-based system, direct data and indirect data, wherein the direct data includes a cookie identification (ID);
aggregating, by the computer-based system, a consumer profile based upon the direct data and the indirect data, wherein the consumer profile includes a consumer preference associated with a consumer;
receiving, by the computer-based system and from the consumer, a designation that a data partner is not eligible to receive the consumer profile;
receiving, by the computer-based system, a designation that the data partner is eligible to be a privileged data partner and receive the consumer profile, wherein the eligibility is based on the consumer visiting a digital destination of a data partner;
receiving, by the computer-based system and from the consumer, a first software-enabled permission that the data partner is the privileged data partner and eligible to receive the consumer profile;
receiving, by the computer-based system and from the consumer, a second software-enabled permission that a type of the data partner is the privileged data partner and eligible to receive the consumer profile, wherein the type of data partner is based upon at least one of the consumer's interest in items offered for sale by the privileged data partner, a transaction history with the privileged data partner, or a location of the privileged data partner;
selecting, by the computer-based system, a subset of the consumer profiles based on common consumer preferences;
storing, by the computer-based system, the subset of the consumer profiles in a database;
including, by the computer-based system, a key field in the database to speed searches;
tuning, by the computer-based system, the database to optimize database performance,
wherein the tuning includes placing frequently used files on separate file systems to reduce in and out bottlenecks;
receiving, by the computer-based system, consumer tracking cookie information stored on a web client based on the cookie ID; and
transmitting, by the computer-based system, the subset of the consumer profiles to the privileged data partner.

16. The article of claim 15, further comprising receiving, by the computer-based system, the consumer preference from the consumer.

17. The article of claim 15, wherein the aggregating further comprises determining at least one of: a pattern and a preference associated with the direct data and the indirect data.

18. The article of claim 15, wherein the aggregating further comprises determining, by the computer-based system, that a threshold amount of purchases associated with the consumer are associated with the consumer preference.

19. The article of claim 15, wherein the aggregating further comprises determining, by the computer-based system, that the consumer browses to digital destinations associated with the consumer preference.

20. The article of claim 15, further comprising updating, by the computer-based system, the consumer profile based upon feedback data.

* * * * *